(12) United States Patent
Sundarkar

(10) Patent No.: US 12,547,609 B2
(45) Date of Patent: Feb. 10, 2026

(54) SYSTEMS AND METHODS FOR STREAMING DATA PIPELINES

(71) Applicant: Express Scripts Strategic Development, Inc., St. Louis, MO (US)

(72) Inventor: Nilay Mukund Sundarkar, Georgetown, TX (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 50 days.

(21) Appl. No.: 18/113,197

(22) Filed: Feb. 23, 2023

(65) Prior Publication Data

US 2024/0289322 A1    Aug. 29, 2024

(51) Int. Cl.
  *G06F 16/23* (2019.01)
  *G06F 16/22* (2019.01)

(52) U.S. Cl.
  CPC .......... *G06F 16/2379* (2019.01); *G06F 16/22* (2019.01)

(58) Field of Classification Search
  CPC .............................. G06F 16/2379; G06F 16/22
  See application file for complete search history.

(56) References Cited

U.S. PATENT DOCUMENTS

| | | | |
|---|---|---|---|
| 5,586,310 A | 12/1996 | Sharman | |
| 7,502,809 B2 | 3/2009 | Albornoz | |
| 7,725,479 B2 | 5/2010 | Cornacchia, III | |
| 7,904,898 B2 | 3/2011 | King | |
| 9,135,279 B2 | 9/2015 | Moromisato | |
| 9,170,848 B1 | 10/2015 | Goldman | |
| 9,250,774 B2 | 2/2016 | Aghadavoodi Jolfaei | |
| 9,992,238 B2 | 6/2018 | Cai | |
| 10,326,769 B2 | 6/2019 | Ilieva | |
| 10,521,284 B2 | 12/2019 | Mcclory | |
| 10,572,479 B2 | 2/2020 | Welton | |
| 10,720,232 B2 | 7/2020 | Giordano | |
| 10,771,327 B2 | 9/2020 | Bendre | |
| 10,861,049 B2 | 12/2020 | Dun | |
| 2011/0166884 A1* | 7/2011 | Lesselroth | G16H 10/60 705/3 |

(Continued)

FOREIGN PATENT DOCUMENTS

WO          200113274 A2    2/2001

*Primary Examiner* — Van H Oberly
*Assistant Examiner* — Samuel C Sharpless, III
(74) *Attorney, Agent, or Firm* — Dickinson Wright PLLC

(57) ABSTRACT

A method for streaming data pipelines includes receiving, at a first update application programming interface, a global unique identifier corresponding an entity and information associated with the entity. The method also includes determining whether the global unique identifier exists in an entity database, the entity data being configured to store information associated with one or more entities and, in response to a determination that the global unique identifier does not exist in the entity database, performing a write command to write the global unique identifier to a registry. The method also includes determining whether the write command was successful, and, in response to a determination that the write command was unsuccessful: retrieving the global unique identifier written to the registry by a second update application programming interface; and updating the entity database with information associated with the global unique identifier.

20 Claims, 10 Drawing Sheets

(56) References Cited

U.S. PATENT DOCUMENTS

2018/0287897 A1* 10/2018 Brajkovic ............ H04L 41/046
2018/0350246 A1    12/2018 Burgess
2023/0401232 A1* 12/2023 Cseri ................... G06F 21/6218

* cited by examiner

SYSTEMS AND METHODS FOR STREAMING DATA PIPELINES

TECHNICAL FIELD

This disclosure relates to streaming data pipelines, and in particular to systems and methods for streaming data pipelines using a first computing device processing data in parallel with a second computing device.

BACKGROUND

Medications, such as prescription medications, over-the-counter medications, vitamins, supplements, and the like, are typically provided by a medication provider, such as a large volume pharmacy and the like. Providing, by the medication provider, such prescription medications may involve generating prescription claims, generating insurance claims, reviewing medical records, and the like, which may generate various data and/or information for a user associated with the medication provider.

Such data may be stored in a database associated with a first computing device and may be manageable (e.g., accessible, retrievable, updateable, and the like) using an application programming interface. Periodically, due to data storage constraints, for example, the data stored in the database may be moved to another database associated with a second computing device or multiple other computing devices.

SUMMARY

This disclosure relates generally to streaming data pipelines.

An aspect of the disclosed embodiments includes a system for streaming data pipelines. The system includes a processor and a memory. The memory includes instructions that, when executed by the processor, cause the processor to: receive, at a first update application programming interface, a global unique identifier corresponding an entity and information associated with the entity; determine whether the global unique identifier exists in an entity database, the entity data being configured to store information associated with one or more entities; in response to a determination that the global unique identifier does not exist in the entity database, perform a write command to write the global unique identifier to a registry; determine whether the write command was successful; and, in response to a determination that the write command was unsuccessful: retrieve the global unique identifier written to the registry by a second update application programming interface; and update the entity database with information associated with the global unique identifier.

Another aspect of the disclosed embodiments includes a method for streaming data pipelines. The method includes receiving, at a first update application programming interface, a global unique identifier corresponding an entity and information associated with the entity. The method also includes determining whether the global unique identifier exists in an entity database, the entity data being configured to store information associated with one or more entities and, in response to a determination that the global unique identifier does not exist in the entity database, performing a write command to write the global unique identifier to a registry. The method also includes determining whether the write command was successful, and, in response to a determination that the write command was unsuccessful: retrieving the global unique identifier written to the registry by a second update application programming interface; and updating the entity database with information associated with the global unique identifier.

Another aspect of the disclosed embodiments includes a tangible, non-transitory computer-readable medium that stores instructions that, when executed, cause a first computing device to: receive, at a first update application programming interface associated with the first computing device, a global unique identifier corresponding an entity and information associated with the entity; determine whether the global unique identifier exists in an entity database, the entity data being configured to store information associated with one or more entities; in response to a determination that the global unique identifier exists in the entity database, update the entity database with information associated with the global unique identifier by correlating the information associated with the global unique identifier with information associated with the global unique identifier previously stored in the entity database; in response to a determination that the global unique identifier does not exist in the entity database, perform a write command to write the global unique identifier to a registry; determine whether the write command was successful; in response to a determination that the write command was successful: create an entry in the entity database for the global unique identifier; and store the information associated with the global unique identifier; and, in response to a determination that the write command was unsuccessful: retrieve the global unique identifier written to the registry by a second update application programming interface associated with a second computing device and being executed in parallel to the first update application programming interface; create an entry in the entity database for the global unique identifier; and store the information associated with the global unique identifier.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
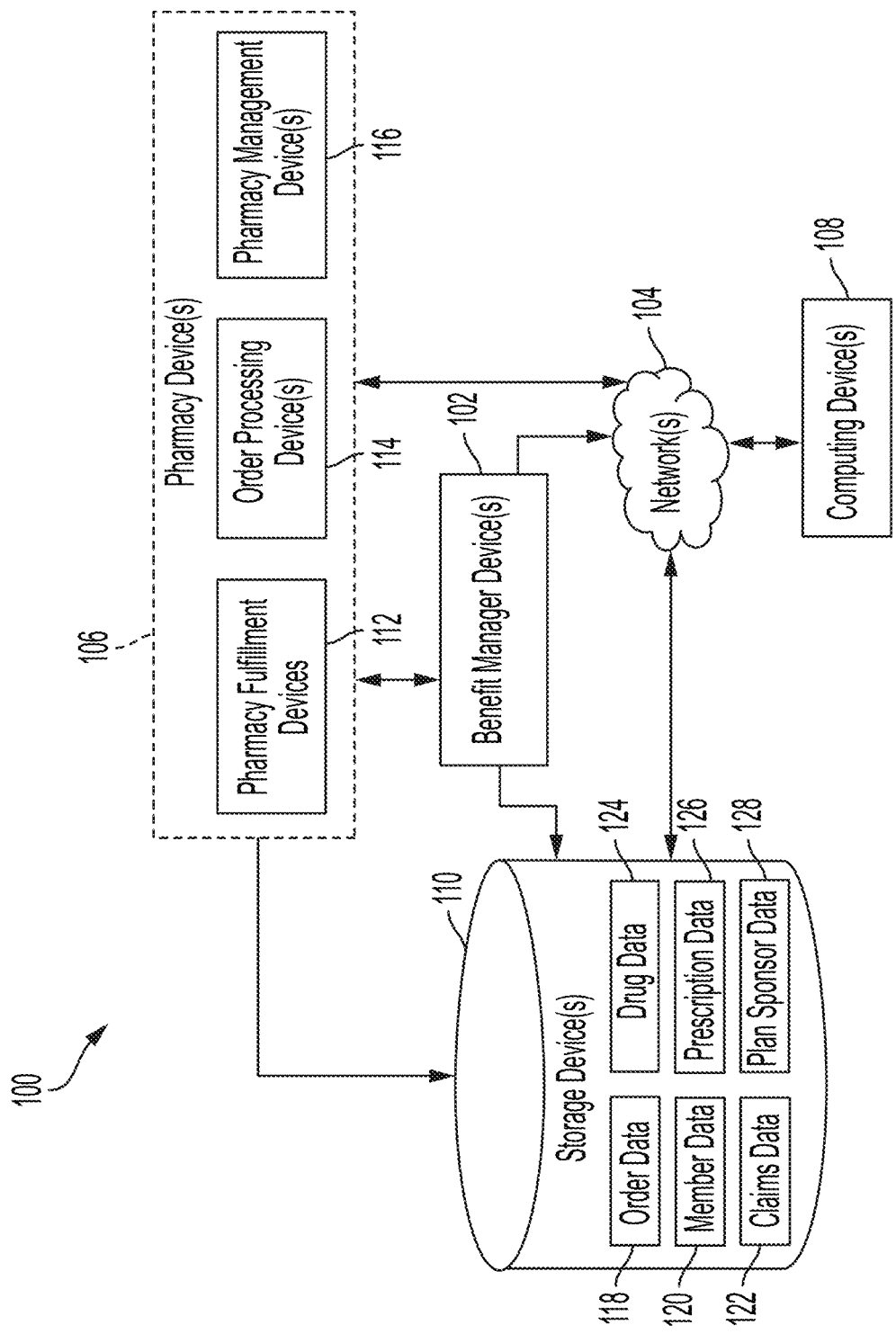
FIG. 1A generally illustrates a functional block diagram of a system including a high-volume pharmacy according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, medications, such as prescription medications, over-the-counter medications, vitamins, supplements, and the like, are typically provided by a medication provider, such as a large volume pharmacy and the like. Providing, by the medication provider, such prescription medications may involve generating prescription claims, generating insurance claims, reviewing medical records, and the like, which may generate various data and/or information for a user associated with the medication provider.

Such data may be stored in data records in a database associated with a first computing device and may be manageable (e.g., accessible, retrievable, updateable, and the like) using an application programming interface. Periodically, due to data storage constraints, for example, the data stored in data records in the database may be moved to another database associated with a second computing device or multiple other computing devices.

Typically, entity data pipelines generate global unique identifiers (e.g., which may be referred to herein as resource-IDs) for a given business key from a legacy datastore. Entity application programming interfaces typically include operations that enable searching by resourceID. Further, entity data is consumed or materialized as read only copies by internal systems, entities that keep identifiers to other entities (e.g., an entity resourceID can be stored by another entity), and/or frontend systems. As such, resourceIDs may be critical for various micro services systems, which may make preserving the sanctity of resourceIDs (e.g., that a given business key always maps to a given resourceID) relatively important.

However, as data from data pipelines that populate the database associated with the first computing device, continues to populate the database associated with the first computing device, it may be difficult to sync data of the database associated with the first computing device with data associated with the other database associated with the second computing device or multiple other computing devices.

When moving the data pipelines to another computing device or a distributed computing system (e.g., such as a public cloud computing device or computing system), the data pipeline may be run in parallel (e.g. on the local computing device and on the other computing device or distributed computing system). As such, two data pipelines may generate a resourceID for a given change data capture (CDC) event (e.g., such as a create event or other suitable CDC event). Additionally, or alternatively, each data pipeline may store the resourceIDs in respective entity data stores.

Accordingly, systems and methods, such as those described herein, configured to synchronize streaming data pipelines, may be desirable. In some embodiments, a user (e.g., such as an insurance member, an account owner, and the like) may take an action (e.g., such as paying for a prescription medication, interacting with a bank account, using a mobile computing device application, and/or any other suitable action) that generates data associated with the action being taken by the user.

In some embodiments, the systems and methods described herein may be configured to, because the global unique identifiers are not generated deterministically, prevent each pipeline from generating different global unique identifiers for the same event. The systems and methods described herein may be configured to use a registry shared by each data pipeline. This registry may be configured to use a "first to reach" function while creating global unique identifiers, to prevent both data pipelines from writing (e.g., creating) the same global unique identifier. The systems and methods described herein may be configured to use a global unique identifier for storing data in an entity database if a data pipeline successfully writes the global unique identifier to the registry. Alternatively, the systems and methods described herein may be configured to the global unique identifier written to the registry by the other data pipeline, data pipeline fails to write the global unique identifier to the registry (e.g., indicating that the global unique identifier is already written to the registry).

In some embodiments, the systems and methods described herein may be configured to use the registry as an intermediate state during data migration from a first computing device to another computing device and/or distributed computing system. The systems and methods described herein may be configured to use the registry to guarantee that the same global unique identifier is not generated by each data pipeline when each data pipeline is creating a new entity record in the entity database for a CDC event (e.g., that is being processed simultaneously or substantially simultaneously by each data pipeline).

In some embodiments, the systems and methods described herein may be configured to have competing data pipeline (e.g., the data pipeline attempting to create an entry in the registry for a global unique identifier after the other data pipeline has created the global unique identifier entry in the registry) read a value in the registry corresponding to the global unique identifier, in case of a failed write to the registry (e.g., a value associated with the global unique identifier is used as a lock, and the natural key is used as the resourceID).

In some embodiments, the systems and methods described herein may be configured to receive, at a first update application programming interface, a global unique identifier corresponding an entity and information associated with the entity. The systems and methods described herein may be configured to determine whether the global unique identifier exists in an entity database. The entity database may be configured to store information associated with one or more entities. The one or more entities may include a patient, a user (e.g., such as a bank user, an online service user, a social media user, and the like), an insurance member, and/or any other suitable entity. The information associated with the one or more entities may include patient medical record information, pharmacy claim information, banking information, online service information, social media information, insurance claim information, and/or any other suitable information. The information associated with the one or more entities may include nonfunguble token (NFT) related data to prevent creation of duplicate NFTs for a same digital file.

The systems and methods described herein may be configured to, in response to a determination that the global unique identifier exists in the entity database, update the entity database with information associated with the global unique identifier. For example, the systems and methods described herein may be configured to correlate the information associated with the global unique identifier with information associated with the global unique identifier previously stored in the entity database. The information associated with the global unique identifier may include the information associated with the one or more entities associated with the global unique identifier. The systems and methods described herein may be configured to, in response to a determination that the global unique identifier does not exist in the entity database, perform a write command to write the global unique identifier to a registry. The write command may include a conditional write command or other suitable write command.

The systems and methods described herein may be configured to determine whether the write command was successful. A determination that the write command was successful may indicate that the global unique identifier was not in the registry. The systems and methods described herein may be configured to, in response to a determination that the write command was unsuccessful, retrieve the global unique identifier written to the registry by a second update application programming interface, and update the entity database with the information associated with the global unique identifier. For example, the systems and methods described herein may be configured to create an entry in the entity database for the global unique identifier and store the information associated with the global unique identifier in the entity database. The first update application programming interface may be associated with a first computing device or a first distributed computing system (e.g., such as a cloud computing system and/or the like). The second update application programming interface may be associated with a second computing device or a second distributed computing system (e.g., such as a cloud computing system and/or the like). The first update application programming interface may be executed in parallel or substantially in parallel to the second update application programming interface.

The systems and methods described herein may be configured to, in response to a determination that the write command was successful, update the entity database with the information associated with the global unique identifier. For example, the systems and methods described herein may be configured to create an entry in the entity database for the global unique identifier and store the information associated with the global unique identifier in the entity database.

FIG. 1A is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104. The system 100 may also include a storage device 110.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in the storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/ or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
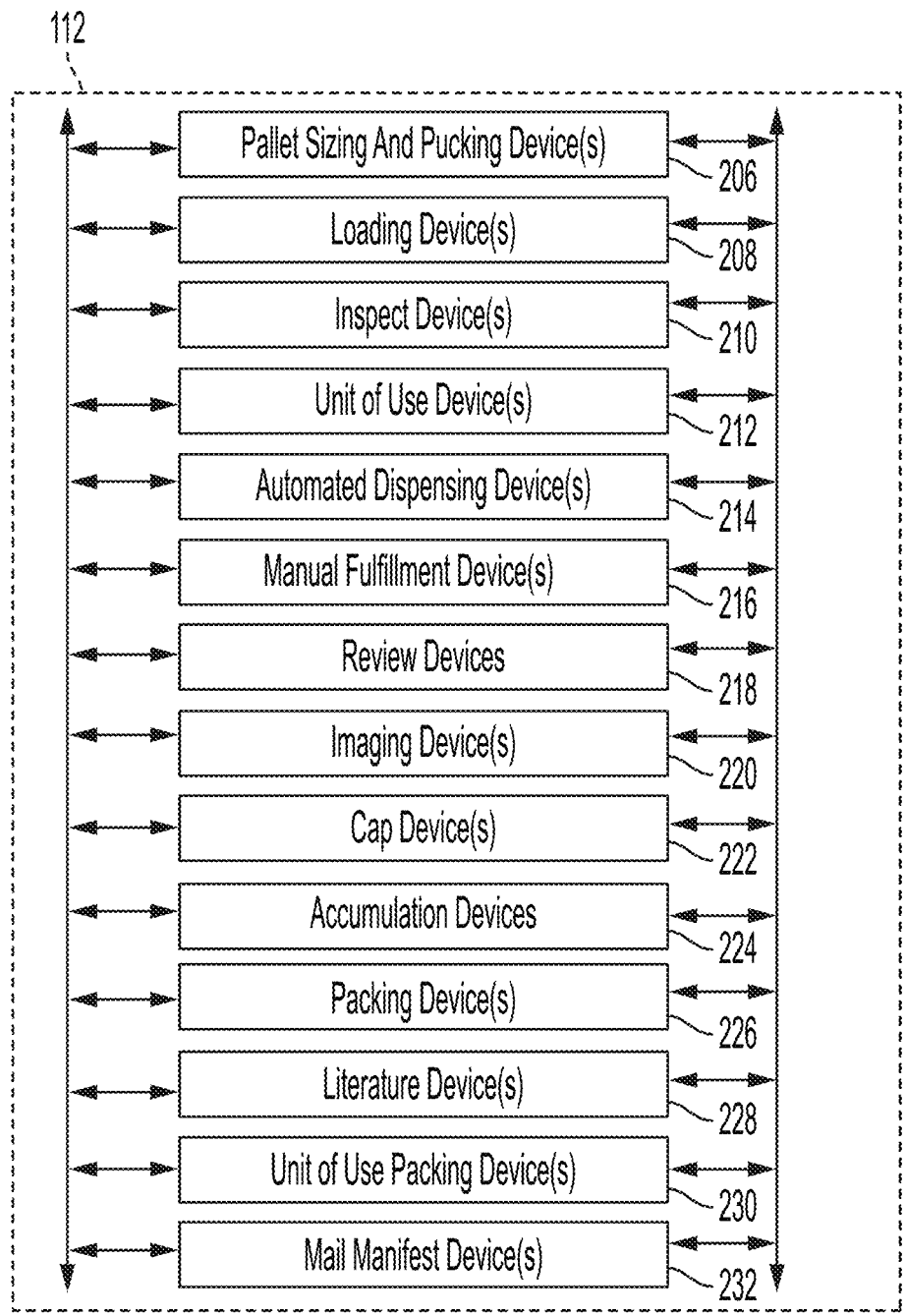
FIG. 2 generally illustrates a functional block diagram of a pharmacy fulfillment device, which may be deployed within the system of FIG. 1A.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
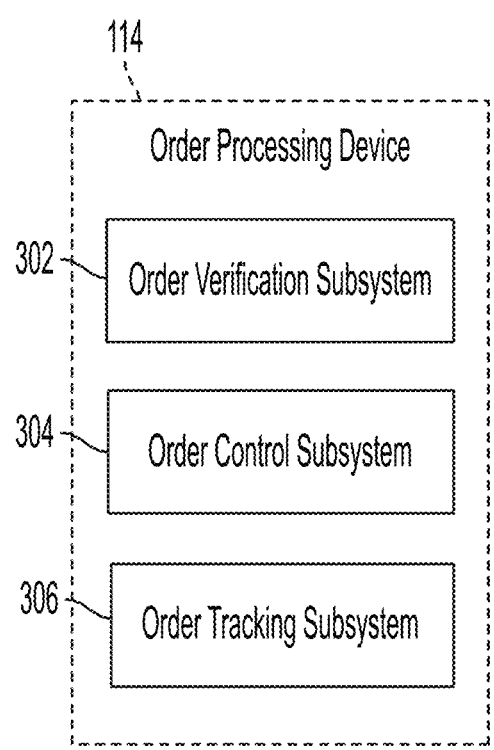
FIG. 3 generally illustrates a functional block diagram of an order processing device, which may be deployed within the system of FIG. 1A.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may include order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, and the like. The order tracking subsystem 306 may store data locally (for example, in a memory) or as a portion of the order data 118 stored in the storage device 110.

Figure 1B:
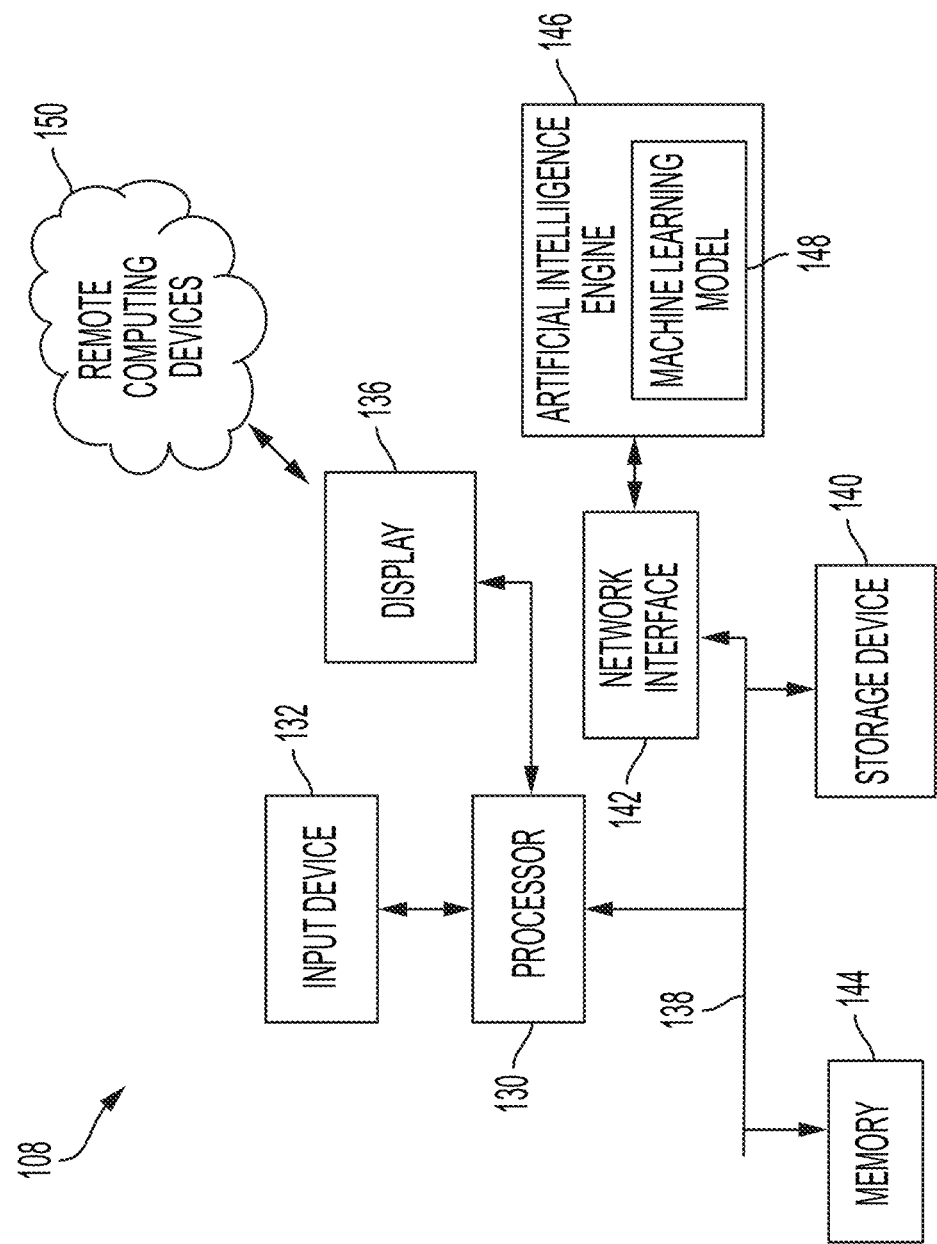
FIG. 1B generally illustrates a computing device according to the principles of the present disclosure.

In some embodiments, the system 100 may include one or more computing devices 108, as is generally illustrated in FIG. 1B. The computing device 108 may include any suitable computing device, such as a mobile computing device, a desktop computing device, a laptop computing device, a server computing device, other suitable computing device, or a combination thereof. The computing device 108 may be used by a user accessing the pharmacy associated with the system 100, as described. Additionally, or alternatively, the computing device 108 may be configured to identify an optimum or substantially optimum combination of data objects, as described.

The computing device 108 may include a processor 130 configured to control the overall operation of computing device 108. The processor 130 may include any suitable processor, such as those described herein. The computing device 108 may also include a user input device 132 that is configured to receive input from a user of the computing device 108 and to communicate signals representing the input received from the user to the processor 130. For example, the user input device 132 may include a button, keypad, dial, touch screen, audio input interface, visual/image capture input interface, input in the form of sensor data, etc.

The computing device 108 may include a display 136 that may be controlled by the processor 130 to display information to the user. A data bus 138 may be configured to facilitate data transfer between, at least, a storage device 140 and the processor 130. The computing device 108 may also include a network interface 142 configured to couple or connect the computing device 108 to various other computing devices or network devices via a network connection, such as a wired or wireless connection, such as the network 104. In some embodiments, the network interface 142 includes a wireless transceiver.

The storage device 140 may include a single disk or a plurality of disks (e.g., hard drives), one or more solid-state drives, one or more hybrid hard drives, and the like. The storage device 140 may include a storage management module that manages one or more partitions within the storage device 140. In some embodiments, storage device 140 may include flash memory, semiconductor (solid state) memory or the like. The computing device 108 may also include a memory 144. The memory 144 may include Random Access Memory (RAM), a Read-Only Memory (ROM), or a combination thereof. The memory 144 may store programs, utilities, or processes to be executed in by the processor 130. The memory 144 may provide volatile data storage, and stores instructions related to the operation of the computing device 108.

In some embodiments, the computing device 108 may use an artificial intelligence engine 146 configured to use at least one machine learning model 148 to perform the embodiments of systems and methods described herein. The artificial intelligence engine 146 may include any suitable artificial intelligence engine and may be disposed on computing device 108 or remotely located from the computing device 108, such as in a cloud computing device or other suitable remotely located computing device. The artificial intelligence engine 146 may use one or more machine learning models 148 to perform at least one of the embodiments disclosed herein. The computing device 108 may include a training engine capable of generating the one or more machine learning models 148. The machine learning models 148 may be trained to prevent multiple data pipelines from creating the same global unique identifier when processing data in parallel.

In some embodiments, the processor 130 may be configured to execute instructions stored on the memory 144 that cause the processor 130 and/or the computing device 108 to process data from two data pipelines, in parallel or substantially in parallel. For example, during a data migration of pharmacy data from a first computing device, such as the computing device 108, to a second computing device, such as the remote computing device 150, there may be a period where data from a data pipeline associated with the computing device 108 is being processed at the same or substantially the same time that the same data is being processed by the remote computing device 150. It should be understood that, while the systems and methods described herein are illustrated and described in the context of a pharmacy and/or pharmacy data, the systems and methods described herein may be applied to any suitable application, entity, industry, and/or data.

Figure 4A:
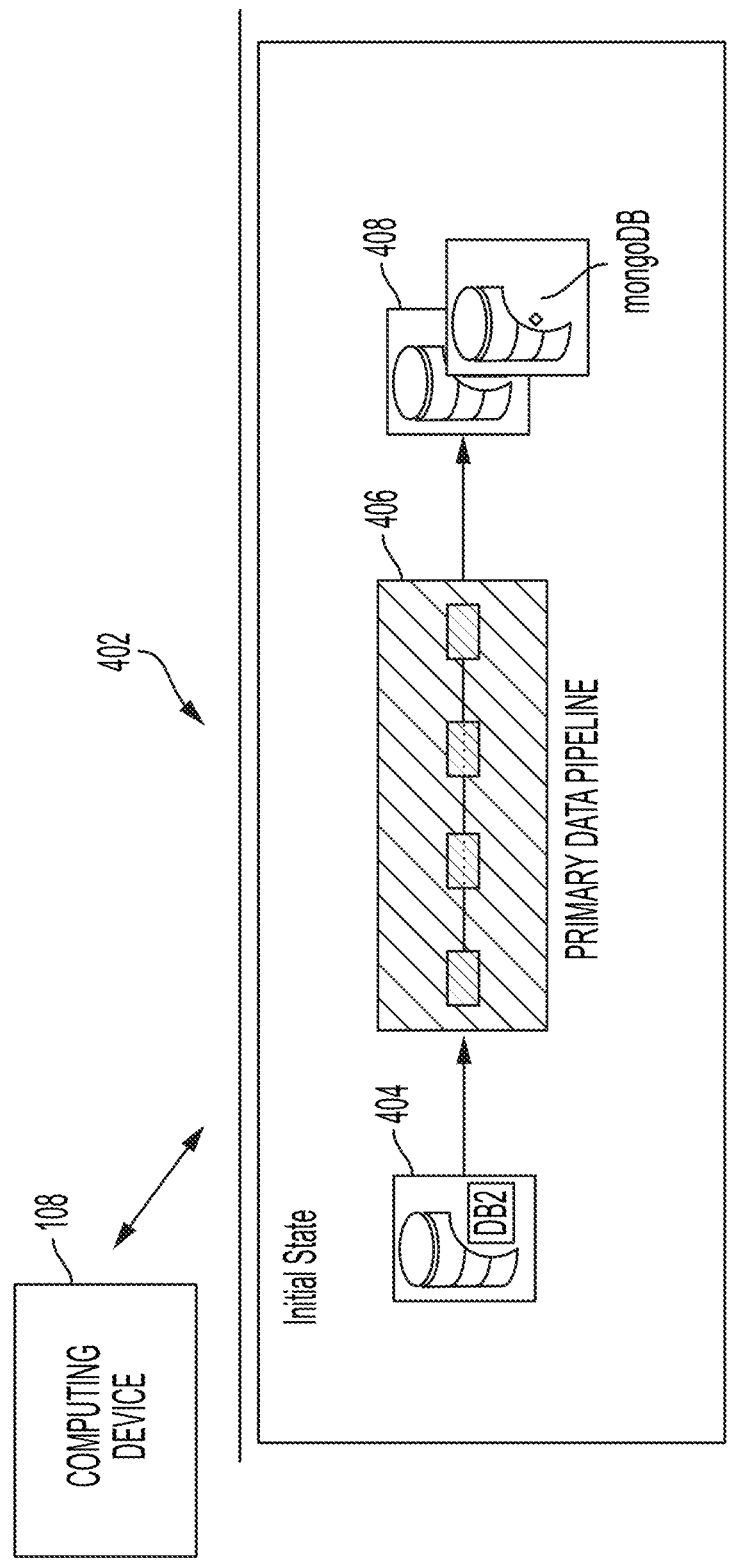
FIGS. 4A-4C generally illustrate steaming data pipeline data storage states according to the principles of the present disclosure.
Figure 4B:
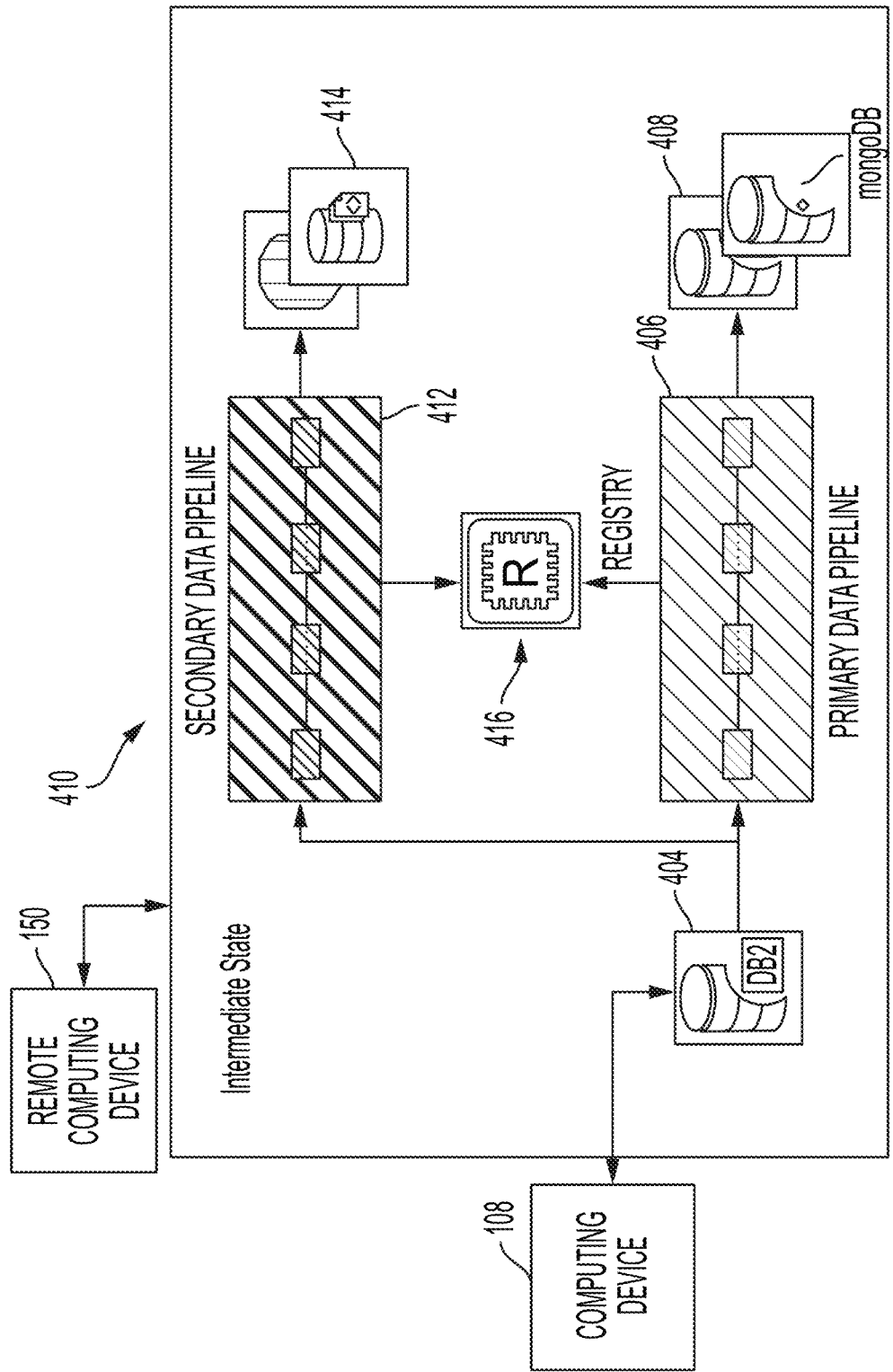
Figure 4C:
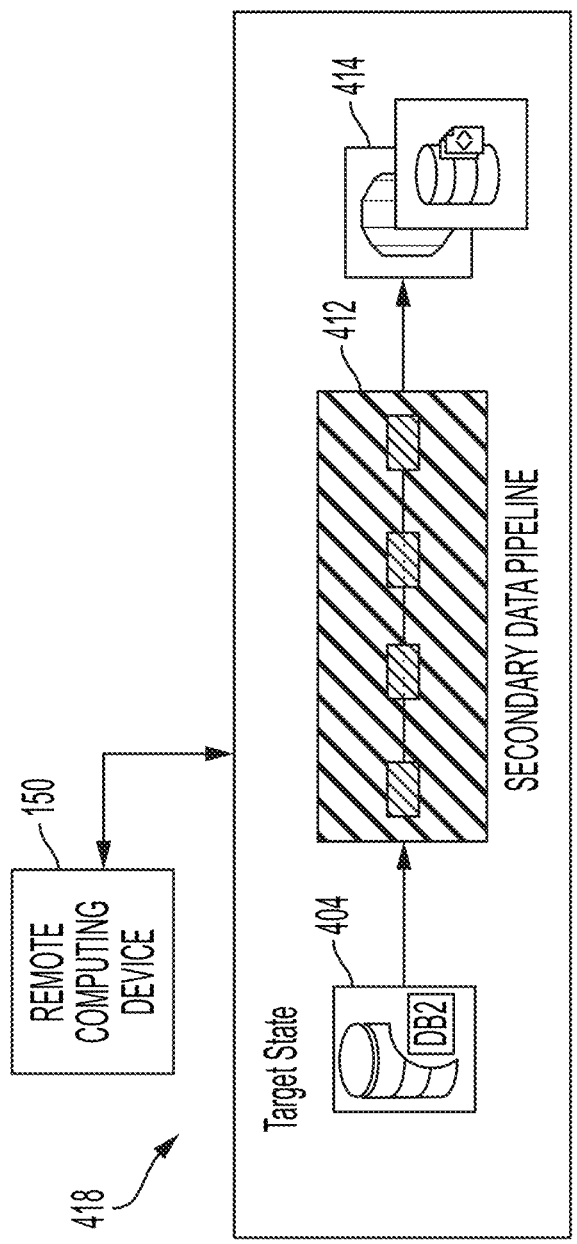

As is generally illustrated in FIGS. 4A-4C, the computing device 108 may store data in an initial state 402. For example, data 404 may be received and processed by a primary data pipeline 406. The primary data pipeline 406 may store the processed data in an entity database 408. During the data migration (e.g., generally illustrated as an intermediate state 410), the computing device 108 may continue to process the data 404 using the primary data pipeline 406, which stores the processed data in the entity database 408. In parallel, or substantially in parallel, the remote computing device 150 may process the data 404 using a secondary data pipeline 412 having features similar to the primary data pipeline 406. The remote computing device 150 may store the processed data in an entity database 414. As will be described, in order to prevent the generation and storage of inaccurate data, inconsistent data, duplicate data, and the like, the computing device 108 and the remote computing device 150 may use a registry 416.

After the data migration is complete, the computing device 10 may no longer process the data 404. For example, the remote computing device 150 may process the data 404 using the secondary data pipeline 412 to store the processed data in the entity database 414, as is generally illustrated as a target state 418.

Figure 5:
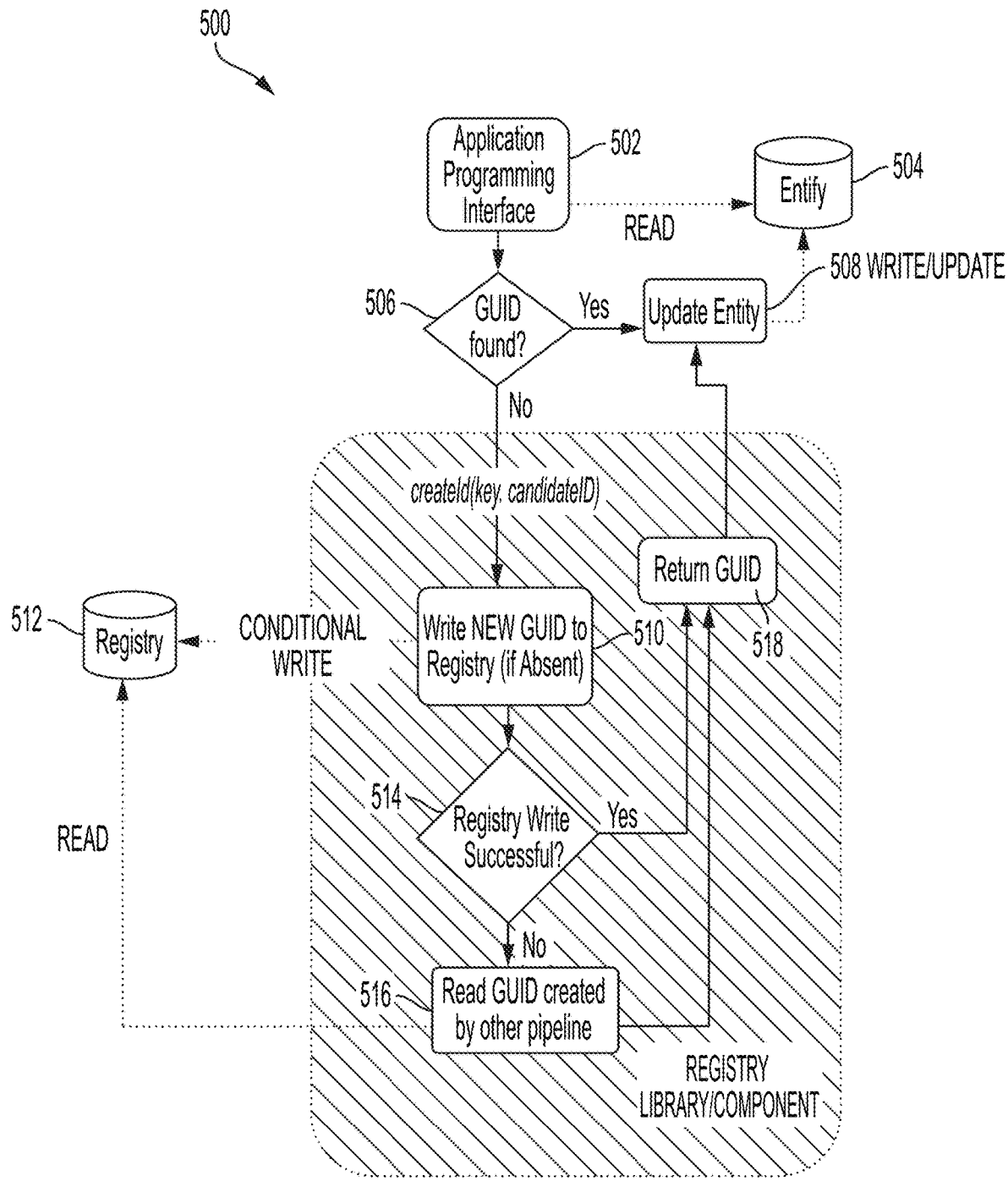
FIG. 5 generally illustrates a block diagram of a streaming data pipeline data storage process flow according to the principles of the present disclosure.

With reference to FIG. 5, a block diagram of a streaming data pipeline data storage process flow 500 is generally illustrated. The process flow 500 may be performed, executed, or run on each of the computing device 108 and the remote computing device 150 in parallel or substantially in parallel. For example, the computing device 108 may receive, at a first update application programming interface 502, a global unique identifier (e.g., generally illustrated as "GUID") corresponding an entity and information associated with the entity. The computing device 108 may read an entity database 504 to search for the global unique identifier. The computing device 108 may determine, at 506, whether the global unique identifier exists in the entity database 504 based on the read of the entity database 504.

If the computing device 108 determines that the global unique identifier exists in the entity database 504, the computing device 108 may update, at 508, the entity database 504 with information associated with the global unique identifier. For example, the computing device 108 may correlate the information associated with the global unique identifier with information associated with the global unique identifier previously stored in the entity database 504. Alternatively, if the computing device 108 determines that the global unique identifier does not exist in the entity database 504, the computing device 108 may perform a write command at 510 to write the global unique identifier to a registry 512.

At 514, the computing device 108 may determine whether the write command was successful. If the computing device 108 determines that the write command was unsuccessful, the computing device 108 may read and retrieve, at 516, the global unique identifier written to the registry 512 by a second update application programming interface being executed, performed, or run on the remote computing device 150. The computing device 108 may return, at 518, the global unique identifier read from the registry 512. The computing device 108 may update, at 508, the entity database 504 with the information associated with the global unique identifier. For example, the computing device 108 may create an entry in the entity database 504 for the global unique identifier. The computing device 108 may store the information associated with the global unique identifier in the entity database 504.

Alternatively, at 514, if the computing device 108 determines that the write command was successful, the computing device 108 may return, at 518, the global unique identifier written to the registry by the computing device 108. The computing device 108 may update, at 508, the entity database 504 with the information associated with the global unique identifier. For example, the computing device 108 may create an entry in the entity database 504 for the global unique identifier. The computing device 108 may store the information associated with the global unique identifier in the entity database 504.

Figure 6:
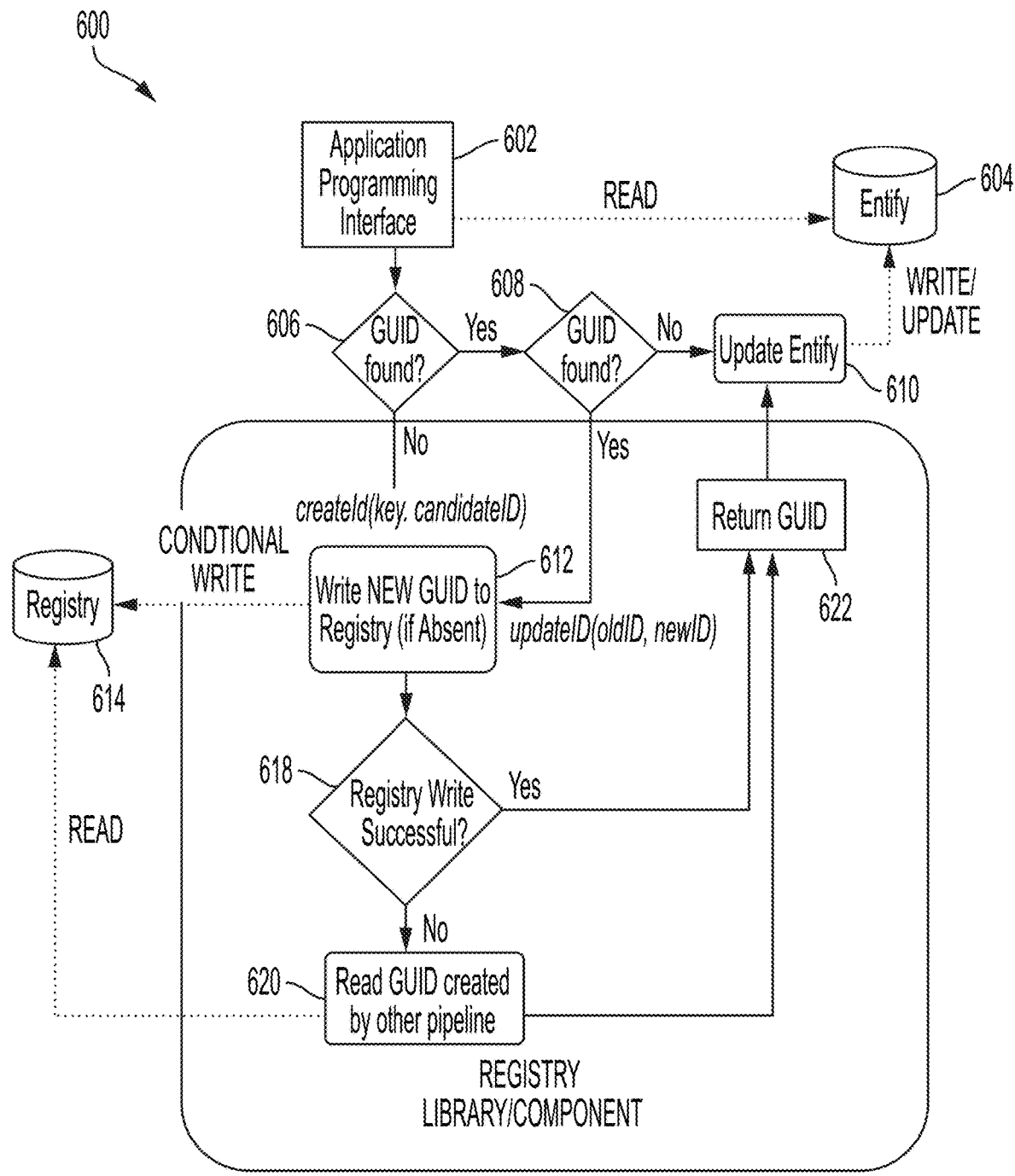
FIG. 6 generally illustrates a block diagram of an alternative streaming data pipeline data storage process flow according to the principles of the present disclosure.

With reference to FIG. 6, a block diagram of an alternative streaming data pipeline data storage process flow 600 is generally illustrated. The process flow 600 may be performed, executed, or run on each of the computing device 108 and the remote computing device 150 in parallel or substantially in parallel. For example, the computing device 108 may receive, at a first update application programming interface 602, a global unique identifier (e.g., generally illustrated as "GUID") corresponding an entity and information associated with the entity. The computing device 108 may read an entity database 604 to search for the global unique identifier. The computing device 108 may determine, at 606, whether the global unique identifier exists in the entity database 604 based on the read of the entity database 604.

If the computing device 108 determines that the global unique identifier exists in the entity database 604, the computing device 108 may determine, at 608, whether to update the global unique identifier in the entity database 604. If the computing device 108 determines not to update the global unique identifier, the computing device 108 may update, at 610, the entity database 504 with information associated with the global unique identifier. For example, the computing device 108 may correlate the information associated with the global unique identifier with information associated with the global unique identifier previously stored in the entity database 604. Alternatively, if the computing device 108 determines to update the global unique identifier, the computing device 108 continues at 612.

At 606, if the computing device 108 determines that the global unique identifier does not exist in the entity database 604, the computing device 108 may perform, at 612, a write command to write the global unique identifier to a registry 614.

At 618, the computing device 108 may determine whether the write command was successful. If the computing device 108 determines that the write command was unsuccessful, the computing device 108 may read and retrieve, at 620, the global unique identifier written to the registry 614 by a second update application programming interface being executed, performed, or run on the remote computing device 150. The computing device 108 may return, at 622, the global unique identifier read from the registry 614. The computing device 108 may update, at 610, the entity database 604 with the information associated with the global unique identifier. For example, the computing device 108 may create an entry in the entity database 604 for the global unique identifier. The computing device 108 may store the information associated with the global unique identifier in the entity database 604.

Alternatively, at 618, if the computing device 108 determines that the write command was successful, the computing device 108 may return, at 622, the global unique identifier written to the registry by the computing device 108. The computing device 108 may update, at 610, the entity database 604 with the information associated with the global unique identifier. For example, the computing device 108 may create an entry in the entity database 604 for the global unique identifier. The computing device 108 may store the information associated with the global unique identifier in the entity database 604.

In some embodiments, the computing device 108 and/or the system 100 may perform the methods described herein.

However, the methods described herein as performed by the computing device 108 and/or the system 100 are not meant to be limiting, and any type of software executed on a computing device or a combination of various computing devices can perform the methods described herein without departing from the scope of this disclosure.

Figure 7:
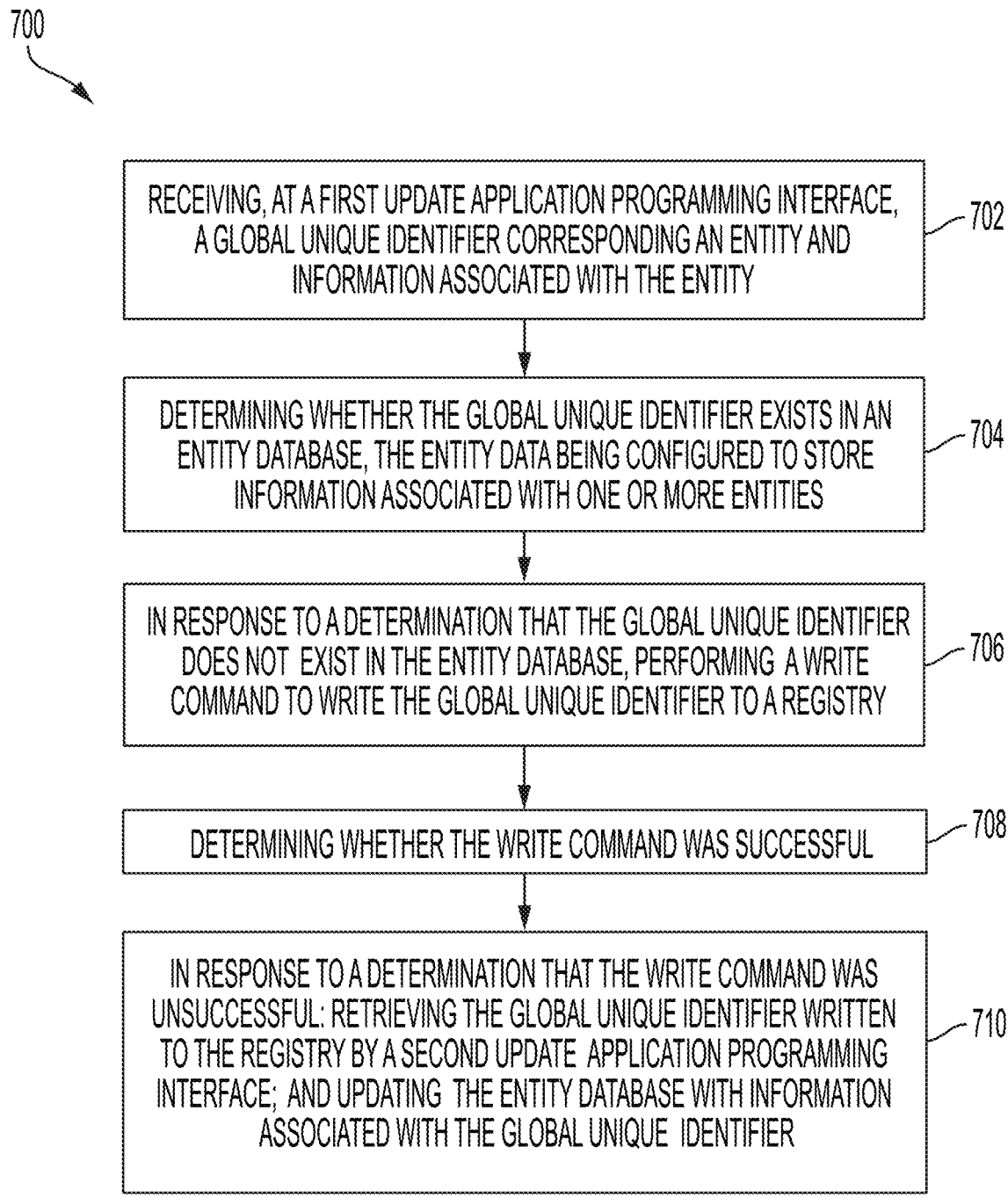
FIG. 7 is a flow diagram generally illustrating a streaming data pipeline data storage method according to the principles of the present disclosure.

FIG. 7 is a flow diagram generally illustrating a streaming data pipeline data storage method 700 according to the principles of the present disclosure. At 702, the method 700 receives, at a first update application programming interface, a global unique identifier corresponding an entity and information associated with the entity. For example, the computing device 108 and/or the remote computing device 150 may receive the global unique identifier.

At 704, the method 700, determines whether the global unique identifier exists in an entity database. The entity data may be configured to store information associated with one or more entities. For example, the computing device 108 and/or the remote computing device 150 may determine whether the global unique identifier exists in an entity database.

At 706, the method 700, in response to a determination that the global unique identifier does not exist in the entity database, performs a write command to write the global unique identifier to a registry. For example, the computing device 108 and/or the remote computing device 150 may, in response to the determination that the global unique identifier does not exists in the entity database, perform the write command to write the global unique identifier to the registry. Alternatively, the computing device 108 and/or the remote computing device 150 may, in response to the determination that the global unique identifier exists in the entity database, update the entity database, as described herein.

At 708, the method 700 determines whether the write command was successful. For example, the computing device 108 and/or the remote computing device 150 may determine whether the write command was successful.

At 710, the method 700, in response to a determination that the write command was unsuccessful, retrieves the global unique identifier written to the registry by a second update application programming interface, and updates the entity database with information associated with the global unique identifier. For example, in response to a determination that the write command was unsuccessful, the computing device 108 and/or the remote computing device 150 may retrieve the global unique identifier written to the registry by a second update application programming interface (e.g., being executed, performed, or run on the other of the computing device 108 and/or the remote computing device 150), and update the entity database with information associated with the global unique identifier. Alternatively, in response to a determination that the write command was successful, the computing device 108 and/or the remote computing device 150 may update the entity database with information associated with the global unique identifier.

In some embodiments, a system for streaming data pipelines includes a processor and a memory. The memory includes instructions that, when executed by the processor, cause the processor to: receive, at a first update application programming interface, a global unique identifier corresponding an entity and information associated with the entity; determine whether the global unique identifier exists in an entity database, the entity data being configured to store information associated with one or more entities; in response to a determination that the global unique identifier does not exist in the entity database, perform a write command to write the global unique identifier to a registry; determine whether the write command was successful; and, in response to a determination that the write command was unsuccessful: retrieve the global unique identifier written to the registry by a second update application programming interface; and update the entity database with information associated with the global unique identifier.

In some embodiments, the instructions further cause the processor to, in response to a determination that the global unique identifier exists in the entity database, update the entity database with the information associated with the global unique identifier. In some embodiments, in response to the determination that the global unique identifier exists in the entity database, updating the entity database with the information associated with the global unique identifier includes correlating the information associated with the global unique identifier with information associated with the global unique identifier previously stored in the entity database. In some embodiments, in response to the determination that the write command was unsuccessful, updating the entity database with the information associated with the global unique identifier includes creating an entry in the entity database for the global unique identifier and storing the information associated with the global unique identifier. In some embodiments, the instructions further cause the processor to, in response to a determination that the write command was successful, update the entity database with the information associated with the global unique identifier. In some embodiments, in response to the determination that the write command was successful, updating the entity database with the information associated with the global unique identifier includes creating an entry in the entity database for the global unique identifier and storing the information associated with the global unique identifier. In some embodiments, the write command includes a conditional write command. In some embodiments, a determination that the write command was successful indicates that the global unique identifier was not in the registry. In some embodiments, the first update application programming interface is associated with a first computing device associated with the processor and the second update application programming interface is associated with a second computing device. In some embodiments, the first update application programming interface is executed in parallel to the second update application programming interface. In some embodiments, the one or more entities are associated with at least one of patient medical records, pharmacy claims, and insurance claims.

In some embodiments, a method for streaming data pipelines includes receiving, at a first update application programming interface, a global unique identifier corresponding an entity and information associated with the entity. The method also includes determining whether the global unique identifier exists in an entity database, the entity data being configured to store information associated with one or more entities and, in response to a determination that the global unique identifier does not exist in the entity database, performing a write command to write the global unique identifier to a registry. The method also includes determining whether the write command was successful, and, in response to a determination that the write command was unsuccessful: retrieving the global unique identifier written to the registry by a second update application programming interface; and updating the entity database with information associated with the global unique identifier.

In some embodiments, the method also includes, in response to a determination that the global unique identifier exists in the entity database, updating the entity database with the information associated with the global unique identifier. In some embodiments, in response to the determination that the global unique identifier exists in the entity database, updating the entity database with the information associated with the global unique identifier includes correlating the information associated with the global unique identifier with information associated with the global unique identifier previously stored in the entity database. In some embodiments, in response to the determination that the write command was unsuccessful, updating the entity database with the information associated with the global unique identifier includes creating an entry in the entity database for the global unique identifier and storing the information associated with the global unique identifier. In some embodiments, the method also includes, in response to a determination that the write command was successful, updating the entity database with the information associated with the global unique identifier. In some embodiments, in response to the determination that the write command was successful, updating the entity database with the information associated with the global unique identifier includes creating an entry in the entity database for the global unique identifier and storing the information associated with the global unique identifier. In some embodiments, the write command includes a conditional write command. In some embodiments, a determination that the write command was successful indicates that the global unique identifier was not in the registry.

In some embodiments, a tangible, non-transitory computer-readable medium stores instructions that, when executed, cause a first computing device to: receive, at a first update application programming interface associated with the first computing device, a global unique identifier corresponding an entity and information associated with the entity; determine whether the global unique identifier exists in an entity database, the entity data being configured to store information associated with one or more entities; in response to a determination that the global unique identifier exists in the entity database, update the entity database with information associated with the global unique identifier by correlating the information associated with the global unique identifier with information associated with the global unique identifier previously stored in the entity database; in response to a determination that the global unique identifier does not exist in the entity database, perform a write command to write the global unique identifier to a registry; determine whether the write command was successful; in response to a determination that the write command was successful: create an entry in the entity database for the global unique identifier; and store the information associated with the global unique identifier; and, in response to a determination that the write command was unsuccessful: retrieve the global unique identifier written to the registry by a second update application programming interface associated with a second computing device and being executed in parallel to the first update application programming interface; create an entry in the entity database for the global unique identifier; and store the information associated with the global unique identifier.

Description of various embodiments herein refer to a global unique identifier. A global unique identifier may be a unique string generated by one or more than one computing system to identify a unique file (data record), which can be data or operation on data. In an example, the global unique identifier may be computed as needed and assigned to the file record. The unique file can have an indicator indicating that a global unique identifier assigned to the unique file. In some embodiments, the systems and methods described herein may be configured to generate a global unique identifier may using a data, a time, and a media access control (MAC) address. Additionally, or alternatively, the systems and methods described herein may be configured to generate a global unique identifier using hash (e.g., a media digest algorithm, such as MD5, a secure hash algorithm, such as SHA-1, and/or the like) and namespace. Additionally, or alternatively, the systems and methods described herein may be configured to generate random bits except for N bits (e.g., 6 or 8 bits) to identify specific version or source of global unique identifier. A global unique identifier ma comprise a 128-bit combination. Global unique identifiers may provide a unique value that may be machine readable. In some embodiments, the systems and methods described herein may be configured to use the global unique identifier to prevent duplication of entry in multiple databases as well as assisting the merging of the multiple databases without duplicate entries. Global unique identifiers are useful in at least some of the embodiments described herein as they are generated in real time, e.g., on demand, in a completely automated process.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit" or circuitry." The term "module" may refer to, be part of, or include processor hardware (shared, dedicated, or group, which can include processor circuitry) that executes code and memory hardware (shared, dedicated, or group, which can include memory circuitry) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Code can be machine readable and executable data files. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

What is claimed is:

1. A system for synchronizing streaming data pipelines, the system comprising:
   a processor; and
   a memory including instructions that, when executed by the processor, cause the processor to:
   receive, at a first update application programming interface of a first data pipeline, a global unique identifier corresponding to an entity and information associated with the entity;
   determine whether the global unique identifier exists in an entity database, the entity database being configured to store information associated with one or more entities;
   in response to a determination that the global unique identifier does not exist in the entity database, perform a write command to write the global unique identifier to a registry;
   determine whether the write command was successful; and
   in response to a determination that the write command was unsuccessful:
   retrieve the global unique identifier written to the registry by a second update application programming interface of a second data pipeline; and
   update the entity database with information associated with the global unique identifier, wherein the information associated with the global unique identifier corresponds to a change data capture event, wherein the second data pipeline is configured to update another entity database with the information associated with the global unique identifier and using the global unique identifier, wherein the first data pipeline and the second data pipeline are run in parallel and the entity is represented in the entity database and the other entity database, and wherein only one of the first update application programming interface and the second update application programing interface can successfully perform the write command to the registry for the global unique identifier.

2. The system of claim 1, wherein the instructions further cause the processor to, in response to a determination that the global unique identifier exists in the entity database, update the entity database with the information associated with the global unique identifier.

3. The system of claim 2, wherein, in response to the determination that the global unique identifier exists in the entity database, updating the entity database with the information associated with the global unique identifier includes correlating the information associated with the global unique identifier with information associated with the global unique identifier previously stored in the entity database.

4. The system of claim 1, wherein, in response to the determination that the write command was unsuccessful, updating the entity database with the information associated with the global unique identifier includes creating an entry in the entity database for the global unique identifier and storing the information associated with the global unique identifier.

5. The system of claim 1, wherein the instructions further cause the processor to, in response to a determination that the write command was successful, update the entity database with the information associated with the global unique identifier.

6. The system of claim 5, wherein, in response to the determination that the write command was successful, updating the entity database with the information associated with the global unique identifier includes creating an entry in the entity database for the global unique identifier and storing the information associated with the global unique identifier.

7. The system of claim 1, wherein the write command includes a conditional write command.

8. The system of claim 1, wherein a determination that the write command was successful indicates that the global unique identifier was not in the registry.

9. The system of claim 1, wherein the first update application programming interface is associated with a first computing device associated with the processor and the second update application programming interface is associated with a second computing device.

10. The system of claim 1, wherein the first update application programming interface is executed in parallel to the second update application programming interface.

11. The system of claim 1, wherein the one or more entities are associated with at least one of patient medical records, pharmacy claims, and insurance claims.

12. A method for synchronizing streaming data pipelines, the method comprising:
   receiving, at a first update application programming interface of a first data pipeline, a global unique identifier corresponding an entity and information associated with the entity;
   determining whether the global unique identifier exists in an entity database, the entity database being configured to store information associated with one or more entities;
   in response to a determination that the global unique identifier does not exist in the entity database, performing a write command to write the global unique identifier to a registry;
   determining whether the write command was successful; and
   in response to a determination that the write command was unsuccessful:
   retrieving the global unique identifier written to the registry by a second update application programming interface of a second data pipeline; and
   updating the entity database with information associated with the global unique identifier, wherein the information associated with the global unique identifier corresponds to a change data capture event, wherein the second data pipeline is configured to update another entity database with the information associated with the global unique identifier and using the global unique identifier, and wherein the first data pipeline and the second data pipeline are run in parallel and the entity is represented in the entity database and the other entity database, and wherein only one of the first update application programming interface and the second update application programming interface can successfully perform the write command to the registry for the global unique identifier.

13. The method of claim 12, further comprising, in response to a determination that the global unique identifier exists in the entity database, updating the entity database with the information associated with the global unique identifier.

14. The method of claim 13, wherein, in response to the determination that the global unique identifier exists in the entity database, updating the entity database with the information associated with the global unique identifier includes correlating the information associated with the global unique identifier with information associated with the global unique identifier previously stored in the entity database.

15. The method of claim 12, wherein, in response to the determination that the write command was unsuccessful, updating the entity database with the information associated with the global unique identifier includes creating an entry in the entity database for the global unique identifier and storing the information associated with the global unique identifier.

16. The method of claim 12, further comprising, in response to a determination that the write command was successful, updating the entity database with the information associated with the global unique identifier.

17. The method of claim 16, wherein, in response to the determination that the write command was successful, updating the entity database with the information associated with the global unique identifier includes creating an entry in the entity database for the global unique identifier and storing the information associated with the global unique identifier.

18. The method of claim 12, wherein the write command includes a conditional write command.

19. The method of claim 12, wherein a determination that the write command was successful indicates that the global unique identifier was not in the registry.

20. A tangible, non-transitory computer-readable medium storing instructions that, when executed, cause a first computing device to:
  receive, at a first update application programming interface of a first data pipeline associated with the first computing device, a global unique identifier corresponding an entity and information associated with the entity;
  determine whether the global unique identifier exists in an entity database, the entity database being configured to store information associated with one or more entities;
  in response to a determination that the global unique identifier exists in the entity database, update the entity database with information associated with the global unique identifier by correlating the information associated with the global unique identifier with information associated with the global unique identifier previously stored in the entity database;
  in response to a determination that the global unique identifier does not exist in the entity database, perform a write command to write the global unique identifier to a registry;
  determine whether the write command was successful;
  in response to a determination that the write command was successful:
    create an entry in the entity database for the global unique identifier; and
    store the information associated with the global unique identifier; and
  in response to a determination that the write command was unsuccessful:
    retrieve the global unique identifier written to the registry by a second update application programming interface of a second data pipeline associated with a second computing device and being executed in parallel to the first update application programming interface;
    create an entry in the entity database for the global unique identifier; and
    store the information associated with the global unique identifier,
  wherein the information associated with the global unique identifier corresponds to a change data capture event, wherein the second data pipeline is configured to store the information associated with the global unique identifier in another entity database using the global unique identifier, and wherein the first data pipeline and the second data pipeline are run in parallel and the entity is represented in the entity database and the other entity database, and wherein only one of the first update application programming interface and the second update application programing interface can successfully perform the write command to the registry for the global unique identifier.

* * * * *